United States Patent [19]

Hall

[11] Patent Number: 4,468,423

[45] Date of Patent: Aug. 28, 1984

[54] INSULATING CELL ELEMENT AND STRUCTURES COMPOSED THEREOF

[76] Inventor: Arlie Hall, 4204 Rolling Hills Dr., Lexington, Ky. 40511

[21] Appl. No.: 442,404

[22] Filed: Nov. 17, 1982

[51] Int. Cl.³ .............................................. B32B 3/12
[52] U.S. Cl. ....................................... 428/72; 52/791; 52/806; 428/116
[58] Field of Search ..................................... 428/68–73, 428/116, 72; 52/791, 806

[56] References Cited

U.S. PATENT DOCUMENTS

| | | | |
|---|---|---|---|
| 2,837,779 | 6/1958 | Jacobs | 428/73 X |
| 2,910,396 | 10/1959 | Randall et al. | 428/118 |
| 2,944,504 | 7/1960 | Herman et al. | 428/116 X |
| 3,011,254 | 12/1961 | Melill et al. | 428/116 X |
| 3,030,703 | 4/1962 | Wirsing, Jr. | 428/116 X |
| 3,072,225 | 1/1963 | Cremer et al. | 428/116 X |
| 3,137,602 | 6/1964 | Lincoln | 428/450 X |
| 3,151,712 | 10/1964 | Jackson | 428/116 X |
| 3,220,595 | 11/1965 | Edwards | 428/116 X |
| 3,365,897 | 1/1968 | Middleton et al. | 428/116 X |
| 3,501,367 | 3/1970 | Parker | 428/116 X |
| 3,664,906 | 5/1972 | Hartig | 428/116 |
| 3,753,843 | 8/1973 | Hutchison | 428/116 |
| 3,895,152 | 7/1975 | Carlson et al. | 428/116 |
| 3,919,445 | 11/1975 | Smarook | 428/116 |
| 3,990,201 | 11/1976 | Falbel | 52/171 |
| 3,993,811 | 11/1976 | Walles | 428/35 |
| 4,167,598 | 9/1979 | Logan et al. | 428/116 X |
| 4,303,431 | 12/1981 | Torobin | 65/21.4 |
| 4,303,432 | 12/1981 | Torobin | 65/21.4 |
| 4,303,433 | 12/1981 | Torobin | 65/21.4 |
| 4,305,982 | 12/1981 | Hirsch | 428/72 X |
| 4,394,529 | 7/1983 | Gounder | 428/116 X |

Primary Examiner—Henry F. Epstein
Attorney, Agent, or Firm—Neil F. Markva

[57] ABSTRACT

An insulating cell element comprises a hermetically sealed shell defining a closed chamber having a volumetric space contained by the chamber wall. The space has a vacuum established in an amount sufficient to achieve a heat conductivity of substantially zero through the space. The shell has a structural configuration effective to resist the outside pressure resulting when the vacuum is established in the closed chamber and is further effective to maintain the vacuum over a substantially unlimited period of time. The energy transfer for a single layer of these elements is down to at least about 0.050 BTU per square foot per degree Fahrenheit (°F.) at an overall thickness of about ⅛ of an inch. A plurality of the insulating cell elements are contiguously disposed with respect to each other to form a monolithic structure.

21 Claims, 14 Drawing Figures

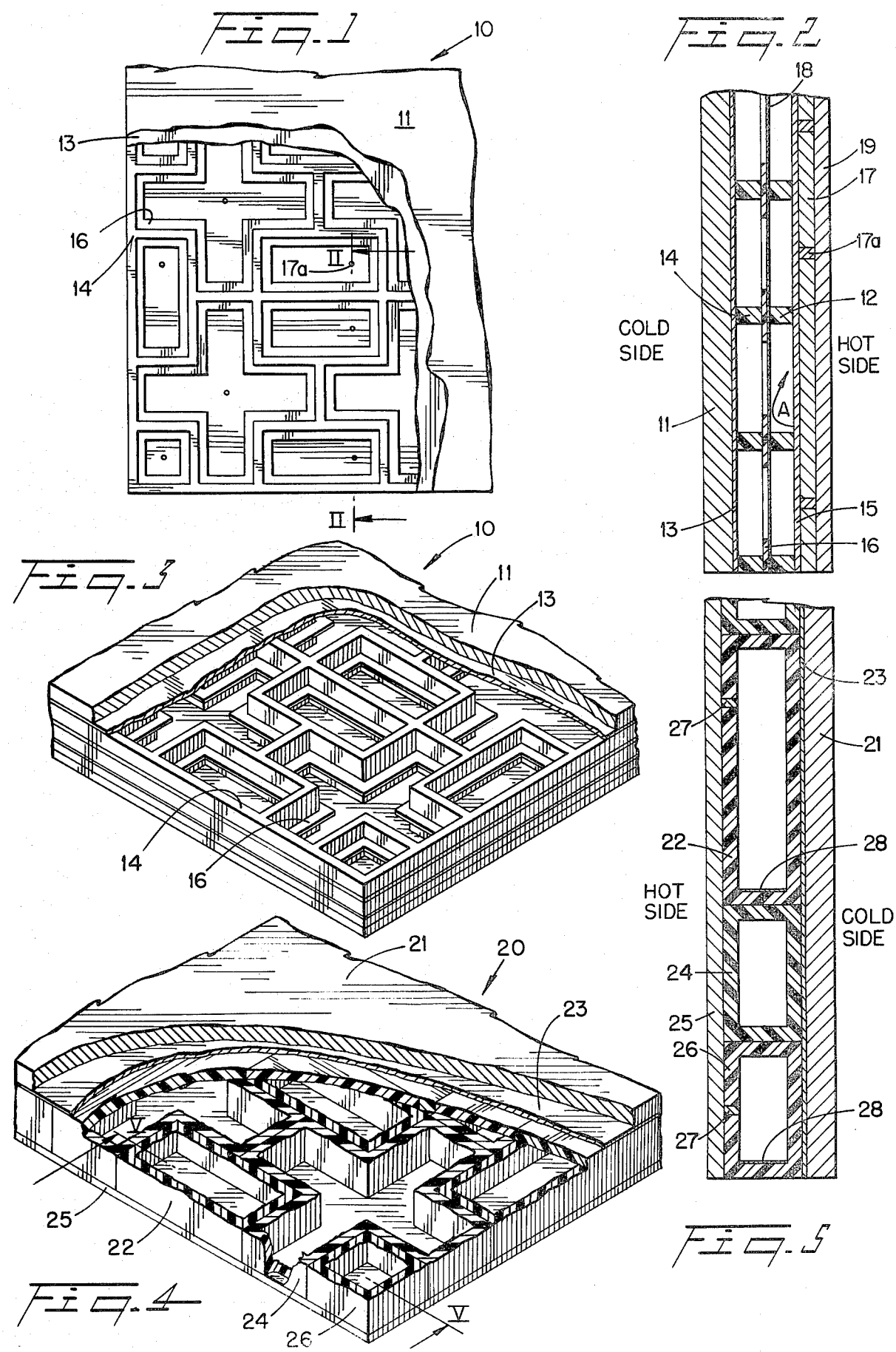

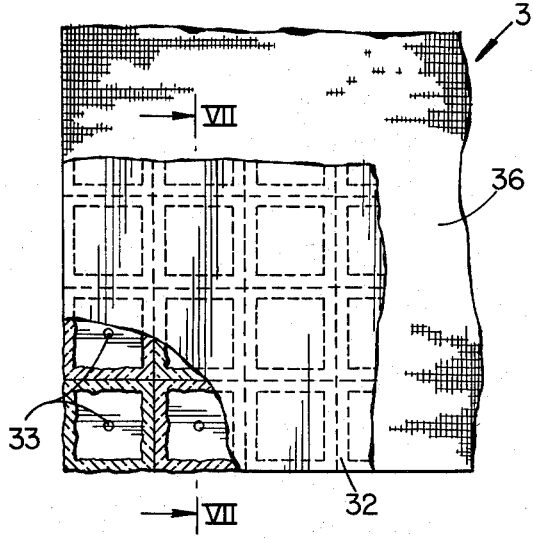
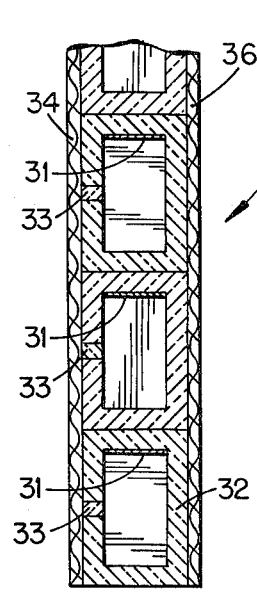
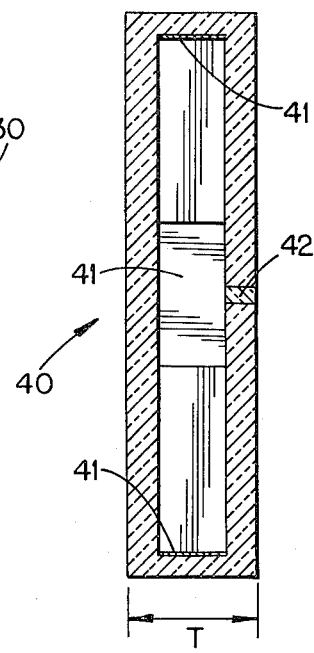
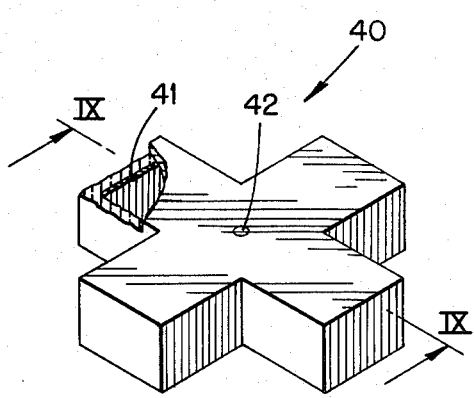
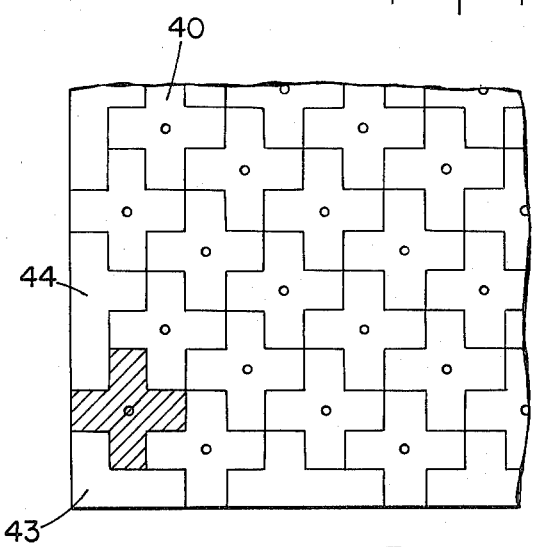
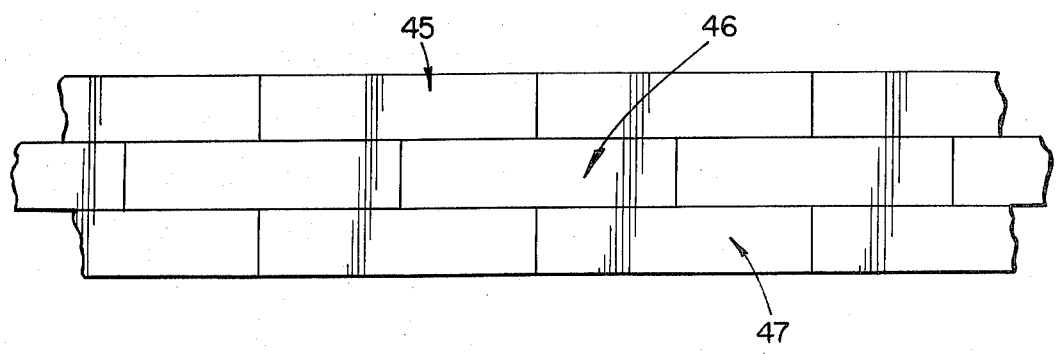

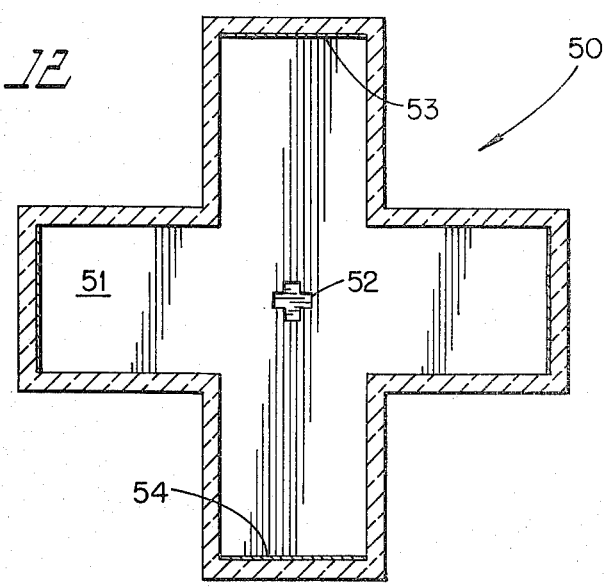
Fig. 12
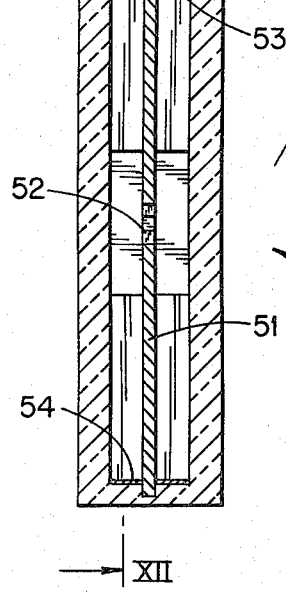
Fig. 13
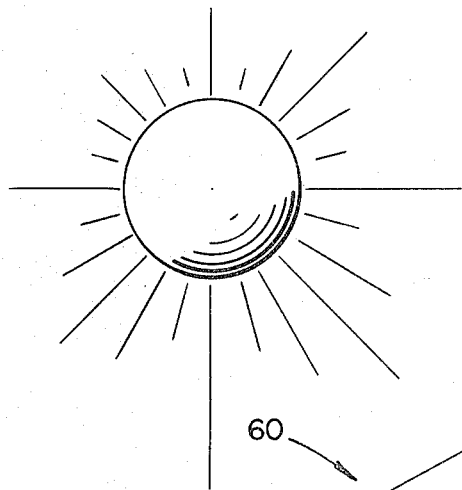
Fig. 14
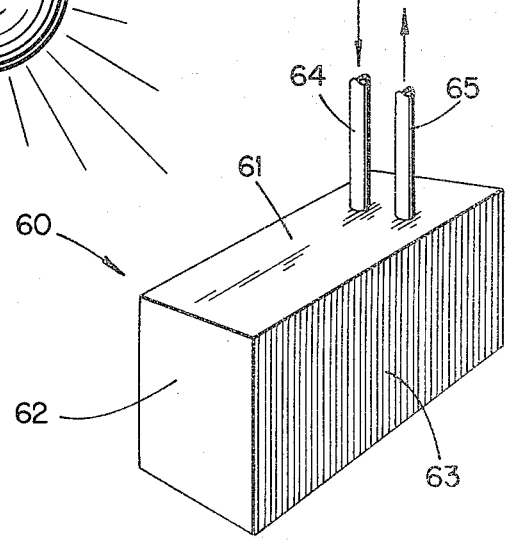

INSULATING CELL ELEMENT AND STRUCTURES COMPOSED THEREOF

FIELD OF THE INVENTION

This invention relates to thermal insulation structures using vacuum as an insulating media. More particularly, this invention relates to insulating cell elements which are useful in producing such structures as building panel assemblies, curtains, wall, ceiling and floor coverings and heat insulating containers.

BACKGROUND OF THE INVENTION

Sandwich panels having cells formed in a honeycomb structure are well known. The cells of these known structures take on various shapes and may be evacuated. Examples of such known panels are found in U.S. Pat. Nos. 2,910,396; 2,944,504; 3,011,254; 3,030,703; 3,072,225; 3,137,602; 3,220,595; 3,664,906; 3,753,843; 3,895,152; 3,919,445 and 3,151,712.

Vacuum insulation involves the use of a double walled vessel having a high vacuum established within the space between the walls. This type of insulation substantially eliminates heat transfer by gaseous conduction and convection. Thus, when using vacuum insulation techniques, it is desirable to minimize heat transfer by radiation and conduction through solid structural members. Information concerning vacuum insulation found at pages 142 through 185 of the book entitled *Cryogenic Engineering* by Russell B. Scott published in 1959 by D. Van Nostrand Co. Inc. of New York, N.Y., is specifically incorporated herein by reference thereto.

The U.S. Pat. No. 3,501,367 discloses the use of a honeycomb core structure wherein the various plurality of cells are all interconnected and a vacuum pump is used to evacuate the entire honeycomb structure at the same time. A similar type of insulation product is shown in U.S. Pat. Nos. 2,837,779 and 3,990,201 both of which show the evacuation of a larger cell having individual sections defined by structure disposed therein.

The U.S. Pat. No. 3,993,811 discloses a plastic thermal insulating panel having a particular type of barrier material disposed on the surface of the plastic material to accomplish specific results in combination with gas absorbing materials such as activated charcoal. The vacuum that is used is disclosed to be down to about $10^{-2}$ mm Hg with a view to establishing a vacuum of about $10^{-1}$ mm Hg. The evacuation space is filled with a solid material.

The U.S. Pat. No. 4,167,598 discloses the use of elongated vacuum chamber panel elements which are contiguously disposed with respect to each other to form elongated panels. Thus, the elongated insulating cells are relatively large in size and there is no disclosure of the particular type of vacuum conditions which prevail in these chambers.

U.S. Pat. Nos. 3,137,602 and 3,365,897 disclose further honeycomb structures used for the construction of nose cones of missiles. The insulation panel of U.S. Pat. No. '897 is evacuated using cryo-vacuum techniques which involve the solidification of air and/or other gases in the cells at cryogenic temperatures.

It is well known that the thermal conductivity of air between atmospheric pressure and approximately 10 torr remains relatively constant. Then there is a sharp drop in the thermal conductivity as the pressure is decreased to about $10^{-3}$ torr. There is little discernable further decrease below $10^{-3}$ torr. At this level of vacuum, the heat conductivity through the evacuated volumetric space is substantially zero.

Energy transfer through a medium generally is due to conduction and radiation. The flow of heat through any surface is from a hot to a cold medium and is directly proportional to its area. Such flow of heat is directly proportional to the difference in the temperatures of the spaces separated by the surface. The amount of energy in Btu's flowing through one square foot of a surface medium per degree Fahrenheit in one hour is the conductivity of the material.

The amount of thermal energy transferred due to radiation is not dependent on a medium but is a function of light and reflectivity. Radiant heat can and does travel through a vacuum. The amount of solar radiated heat depends on the angle of the sun's rays, the color and roughness of the surface medium, the reflectivity of the surface and the type of construction used to form the surface. The intensity of radiant energy is directly proportional to the temperature of the source, and inversely proportional to the square of the distance, and travels at a speed of 186,000 miles per second in a straight line.

PURPOSE OF THE INVENTION

The primary object of this invention is to provide an insulating cell element which will limit the transfer of energy through insulation panels and assemblies.

A further object of the invention is to provide a method of insulating existing uninsulated construction that is difficult to insulate without substantial impairment and cost.

Another object of the invention is to provide a thermal insulation structure which may be adapted as a building insulator which will not have its insulating value destroyed when cut or fractured in any way.

It is a still further object of this invention to provide a panel configuration including hermetically sealed vacuum cells which may be able to achieve high insulating values in a limited space having a very small thickness of down to about ⅛ of an inch.

A still further object of this invention is to provide insulating cell elements which are separate and independent with respect to each other forming individual cell elements that are held together when contiguously disposed with respect to each other.

A still further object of the invention is to provide a thermal insulation structure in the form of a curtain or panel through which light may travel while maintaining a high degree of insulating value.

SUMMARY OF THE INVENTION

As disclosed and described herein, the insulating cell element of this invention comprises a hermetically sealed shell defining a closed chamber having a volumetric space contained by the chamber wall. The space has a vacuum established in an amount sufficient to achieve a minimal heat conductivity through the volumetric space. The vacuum of approximately $10^{-3}$ torr may be achieved as a particular feature of this invention thereby establishing a heat conductivity of substantially zero through the chamber.

The shell of the element has a structural configuration effective to resist the outside pressure resulting when the vacuum is established in the closed chamber. The shell is further effective to maintain the vacuum over a substantially unlimited period of time. The energy transfer for the element is down to at least about 0.050 BTU per square foot per degree Fahrenheit (°F.) at an overall thickness of about ⅛ of an inch.

Another feature of the invention is that the shell material may be translucent, transparent, or effective to allow infrared rays to pass therethrough. A portion of the chamber wall has a film of getter material disposed thereon to absorb any substance which may be volatilized from the shell material into the evacuated space.

A further feature of the invention is the use of a shield disposed within an evacuated space to prevent gas molecules from moving from one section of the chamber wall across the volumetric space to another section of the chamber wall. The use of this shield means may be effected within the individual cell elements or within the context of well known sandwich type panels. Thus, the use of a shield means such as an aluminum foil insert compensates for radiation in its functioning as a grid dividing member.

A still further feature of the invention is the construction of a thermal insulation structure comprising a plurality of the insulating cell elements of the invention contiguously disposed with respect to each other to form a monolithic structure. The monolithic structure includes a layer of insulating cell elements having contacting surfaces contiguously disposed with respect to each other and a means for holding the cell elements in their contiguous disposition. The cell element holding means may include an adhesive material which bonds the contiguously disposed elements together while allowing the shell material of the cell elements to move in accordance with its coefficient of linear expansion. The cell element holding means comprise a continuous sheet of material disposed across at least one side of the layer of cell elements. This enables the formation of such objects as a curtain wherein the continuous sheet is a fabric material or may be a rigid structural panel when the continuous sheet is rigid.

A particular advantage of this invention is that there may be a plurality of layers of the insulating cell elements with one layer overlaying the contacting surfaces of the cell elements in the next layer. Thus, it is possible for a complete adaptation of the insulation structure of the present invention to the particular type of problem being solved. That is, the coefficient of heat transfer can be adjusted in an unlimited manner.

As the result of the basic discovery of the present invention, a further feature is directed to an assembly for storing heat wherein there is a heat absorbing material disposed in an insulated container. The insulated container has a housing composed of a plurality of insulating cell elements contiguously disposed with respect to each other to form a monolithic structure. Each of the insulating cell elements are constructed in accordance with the above description. At least a portion of the housing is effective to allow heat from the sun to pass from the outside of the container through to the heat absorbing material disposed in the container. Since the inside of the container is at a hotter temperature than the outside of the container, the only way that the heat can escape is from the inside to the outside of the container. With the invention of the present application, it is now possible to heat a heat absorbing material disposed in the container through the use of the sun's rays while capturing the heat inside that container through the mechanism of the heat insulating cell elements as set forth herein.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a fragmentary plan view with a portion of a covering removed to show the grid configuration made in accordance with this invention;

FIG. 2 is a sectional view along line II—II of FIG. 1;

FIG. 3 is a fragmentary perspective view of the embodiment of FIG. 1;

FIG. 4 is a fragmentary perspective view of another embodiment of a thermal insulation structure made in accordance with this invention;

FIG. 5 is a sectional view along line V—V of FIG. 4;

FIG. 6 is a fragmentary plan view of a third embodiment of a thermal insulation structure made in accordance with this invention;

FIG. 7 is a sectional view taken along line VII—VII of FIG. 6;

FIG. 8 is a perspective view of an individual insulating cell element made in accordance with this invention and partially in section;

FIG. 9 is a cross-sectional view of the cell element of FIG. 8;

FIG. 10 is a plan view showing the contiguous disposition of individual cell elements as shown in FIG. 8;

FIG. 11 is a plan view of the contiguous disposition of cell elements arranged in a plurality of layers with an overlay of the contacting surfaces of adjacent layers;

FIG. 12 is a sectional view taken along line XII—XII of FIG. 13 of an individual insulating cell element of this invention having a shield disposed therein;

FIG. 13 is a cross-sectional view of the cell element of FIG. 12;

FIG. 14 is a perspective view of an assembly for storing heat with the sun as the heat source.

DETAILED DESCRIPTION

The thermal insulation structure shown in FIGS. 1 through 3 comprises a panel 10 having grid structures 12 and 14 disposed between rigid parallel panels 11, 17 and 19. The panels 11, 17 and 19 are composed of non-porous material such as epoxy treated fiber board. Aluminum foil films 13 and 15 are disposed on the inside surfaces of panel elements 11 and 17, respectively. The aluminum foil grid insert 16 has an opaque lamp black film 18 disposed on one side to radiate absorbed energy back to the panel 17, 19 located on the hot side of the insulation structure. The lamp black film 18 also serves as a getter which maintains the static vacuum by absorbing any materials volatilized from the panel elements 11, 17 and 19.

The grid sections 12 and 14 include three basic geometric shapes, namely, a square, an elongated rectangle and a cross shape. Grid sections 12 and 14 are made of any low-heat conducting, non-porous material such as plastic or epoxy treated fiber board. In this embodiment, grid sections 12 and 14 are composed of polyethylene. A quick bonding epoxy adhesive material is used to connect the panels 11, 17, 19, films 13 and 15, grid sections 12, 14 and foil insert 16 together. In this embodiment, the foil insert is composed of aluminum. The epoxy material acts as a bonding agent and also seals any voids in the surface finish of the elements on which it is disposed. This ensures against any leakage which may occur with respect to the vacuum in any of the individual cells formed by the grid sections 12 and 14.

Once the panel elements 11 and 17 are bonded to the grid sections 12 and 14 as shown, evacuation of the cells formed by the grid sections 12 and 14 is effected through the openings 17a by any suitable means and subsequently sealed. The outer epoxy-treated panel element 19 is then disposed over the panel element 17 as shown. Evacuation of the cells within the grid sections 12 and 14 is effected down to a vacuum pressure level of about $10^{-3}$ torr. At this level, the heat transfer through the space between the foil films 13 and 15 is substantially zero. Additionally, the foil films 13 and 15 reduce the thermal radiation component by reflecting the gas molecules flowing from the hot side to the cold side back to the hot side of the insulation structure 10. In this embodiment, the films 13 and 15 are composed of aluminum which also acts as a getter for any of the materials which may be volatilized due to the vacuum formed in the cells within grid sections 12 and 14. The plastic grid sections 12 and 14 of the present embodiment, are coated with a glyptol compound to aid in reducing the loss of surface gases from the plastic material itself.

In the embodiment shown in FIGS. 1 through 3, the width of the space formed by the grid sections 12 and 14 is about ½ inch between the foil surfaces 13 and 15. The area of the cells formed by the grid sections 12 and 14 may vary from about ¼ inch square to a limit not to exceed the safety strength of the panels 11, 17, 19 which are under atmospheric pressure with the individual cells being evacuated. In this embodiment, the variously shaped cells are set to alternate as five square inches for the cross-shaped cell and two square inches as found in the elongated rectangular shaped cells. The cross-shaped cell provides a support structure on one inch centers and allows five square inches of open space as a vacuum entity. The cross structure has been found to maximize the volume for such vacuum cells. The grid network as shown has a heat dissipator characteristic. That is, heat movement through the grid sections 12 and 14 is dissipated into the vacuum chambers and reflected back to the hot surface. See arrow A which shows the movement of radiant energy as a result of the use of the fin 16 located between the grid sections 12 and 14.

The thermal insulation structure, generally designated 20, in FIGS. 4 and 5 illustrate another embodiment of my invention. A plurality of individually formed, insulating cell elements 22, 24 and 26 are contiguously disposed with respect to each other to form a monolithic structure. Panel members 21 and 25 are disposed on opposite sides of the grid arrangement that is formed by the disposition of the individual cell elements 22, 24 and 26 as shown.

Each of the insulating cell elements 22, 24 and 26 include a hermetically sealed shell which defines a closed chamber having a volumetric space with a vacuum established in an amount sufficient to achieve a minimal heat conductivity through the space formed within the chamber. Each of the shells has a structural configuration effective to resist the outside pressure resulting when the vacuum is established in the closed chamber and is further effective to maintain the vacuum over a substantially unlimited period of time. Each cell element 22, 24 and 26 are separate and independent with respect to each other. Thus, if there is a loss of vacuum in any of the single chambers, this loss does not adversely effect the vacuum conditions in a contiguously disposed insulating cell element. A reflectivity film 23 is disposed on the cold side of the grid elements 22, 24 and 26 and is used to reflect gas molecules coming from the hot side of structure 20 back toward the hot side.

In this embodiment of FIGS. 4 and 5, the rigid panel members 21 and 25 act to hold the layer of insulating cell elements 22, 24 and 26 with their contacting surfaces contiguously disposed with respect to each other. In this embodiment, each shell of the elements 22, 24 and 26 includes a pair of parallel sides which contain the evacuated space therebetween so that when the contacting surfaces of the insulating cell elements 22, 24 and 26 are contiguously disposed there is formed two planar, opposed sides along the layer.

The individual cell elements 22, 24 and 26 may be formed by blowing or molding glass material into the desired shape. The elements may have openings 27 left therein so that the interior end surfaces of the chamber may be coated with a getter 28 such as phosphorus which acts as a getter. Openings 27 are then used to create a vacuum within the chamber formed within the elements 22, 24 or 26 and closed with an appropriate sealing material. Another mechanism for closing openings 27 is to simply heat the glass around the opening and squeeze it together while heated. These operations can take place within a vacuum chamber or under any other suitable vacuum conditions.

Numerous designs of layers can be created through the disposition of various shaped individual insulating cell elements. A further embodiment showing such a design using only square shaped elements is found in FIGS. 6 and 7. The insulation structure 30 comprises a plurality of hermetically sealed elements 32 having a getter film 31 disposed on one side thereof to absorb any substance which may be volatilized from the shell material into the evacuated space. In this embodiment, a flexible material is used to form very thin layers 34 and 36 on opposite sides of the layer having planar, opposed sides as shown. The getter film 31 and the evacuation of the cell elements 32 has been effected through the openings 33. This type of configuration may be used for curtains placed over window openings so that light may be allowed to come through while maintaining an insulation barrier with respect to any heat on the inside of the building moving outwardly through the windows. In this embodiment, the shell material for each of the elements 32 is either translucent or transparent. It is conceivable that the elements 32 might simply be held together using an adhesive material between their contacting surfaces so that they are bonded together in their contiguous disposition. The adhesive material would be effective to allow the shell material of the cell elements to move in accordance with its coefficient of linear expansion. This is important since generally the insulation structure of the present application is used in an environment having one hot side and one cold side.

In the embodiment of FIGS. 6 and 7, the shape of the shells can of course be changed. The independent vacuum cells 32 may be formed in glass, ceramic or the like and sandwiched between aluminum foil, cloth such as nylon or fine screen wire so that it can act as a storm window over a large plate glass window. Such a flexible thermal insulation structure might also be used like the standard Fiberglas insulation between the studs of a building. In its extremely thin state, the structure might be wrapped around curved objects such as pipes, heat ducts and the like to effectuate an improved form of insulation. It is contemplated that there may be a form of wall covering which would include a thin layer of the individual cell elements made in accordance with this invention along the adhesive side of wall paper or standard wall paneling. This type of a structural configuration enables the insulation of existing buildings using decorative wallpaper or wall paneling without having to completely restructure the house while producing a significant increase in insulation capacity.

The embodiment of the insulating cell element 40 shown in FIGS. 8 and 9 has been found to be of particular importance in the construction of thermal insulation structures designed for retrofitting existing wall structures within buildings which are normally difficult to insulate without substantial impairment and cost. The unique cross-shape provides a maximum amount of area to be covered by the parallel sides of the element while minimizing the overall thickness T. It is anticipated that the overall thickness T may be down to about $\frac{1}{8}$ of an inch with a wall thickness being such that the width of the evacuated space is about 1/16 of an inch. The evacuated pressure level in the device is effected through opening 42 and is at a level of about $10^{-3}$ torr. Consequently, the heat transfer through the space formed within the element 40 is substantially zero thereacross. Getter films 41 are located at the end of each of the cross elements. The insulating cell element 40 may be disposed in a design such as shown in FIG. 10 with the spaces 43 and 44 either being left open or having appropriately shaped cell elements disposed therein and made in accordance with this invention.

A further feature of the invention is shown in FIG. 11 wherein individual insulating cell elements 45 are disposed in a multi-layer configuration with the cell elements 45 of one layer overlapping the contacting surfaces of the cell elements 46 in the next layer, and, in turn, the cell elements 46 overlay the contacting surfaces of the cell elements 47 in the third layer. Thus, through the use of the particular insulating cell element configuration of this invention, any desired heat resistance can be achieved by a simple building up of the various layers. Such multi-layer configurations may be made either rigid or flexible depending upon the particular application. It is conceivable that the contiguously formed individual cell elements may be attached to the inside of a window and made with transparent material. Thus, light is allowed to come through, a person can see through the window and yet there is a maximizing of the insulating characteristics at the surface of that window.

It is anticipated that the use of the individual cell elements made in accordance with this invention may achieve a heat transfer in a monolithic structure formed by such contiguously disposed cell elements of down to at least about 0.050 BTU per square foot per °F. at an overall thickness of about $\frac{1}{8}$ of an inch. Such a heat transfer with respect to this type of a thermal insulation device has not been possible heretofore.

The embodiment of an insulating cell element 50 is shown in FIGS. 12 and 13 and includes the disposition of an aluminum foil insert molded into the separately and independently formed member. The aluminum foil is about 0.030 inch standard wire gauge and includes a small cross-shaped hole of $\frac{1}{4}$ inch or less. The foil acts as a shield between the hot and cold surfaces in the insulation structure of which the individual cell element 50 is made a part. The aluminum foil shield 51 reflects the radiation components of the heat attempting to pass from the hot side of an insulation structure to the cold side thereof. Aluminum oxide on the surface of the foil 51 acts to absorb free molecules of oxygen. It is also possible to use lamp black surface as an absorbing agent and further to radiate heat backwardly to the hot wall. The shield 51 acts as a divider of areas and separates the mean free path of hot surface molecules from traveling directly to the cold surface of the cell element. A thin film of getter material 53 and 54 is placed at the ends of the cross-sectional shapes in this particular embodiment.

The embodiment shown in FIG. 14 exemplifies a particular application of the insulating cell elements and structures composed thereof. An assembly comprises a heat absorbing material (not shown) disposed in an insulated container 60. The insulated container 60 has a housing with a plurality of sides 61, 62, 63 and the like composed of the thermal insulation structures made in accordance with this invention. That is, there are a plurality of insulating cell elements contiguously disposed with respect to each other to form a monolithic structure for the entire container 60. At least a portion of the housing such as the top side 61 is effective to allow heat from the sun to pass from the outside of the container 60 therethrough to the heat absorbing material disposed in the container. In this instance, the material used to form the panel 61 is effective to allow infrared rays to pass therethrough while maintaining the heat absorbed by the heat absorbing material inside the container. The benefits of this type of configuration are obviously unlimited when it concerns the capturing of the thermal energy from the sun's rays. That energy can in turn be used to heat other locations and simply store heat energy until such time that it is required to be used. For example, water may be directed from a source (not shown) into a coil located within the container 60 through inlet 64. Hot water would then be discharged from outlet 65 to supply a hot water heating system.

Energy transfer through materials is usually expressed in U and R-values. The calculation of these values is well known as is their significance when determining the insulating characteristics of materials. The higher the R-value, the greater is the insulating power for a particular material. Various thicknesses of known materials achieve specific R-values. For example, Table I shows thicknesses of selected insulation materials required to achieve a R-value of 19 in the sidewalls of a building structure.

TABLE I

| To Achieve R-19 | |
| --- | --- |
| Insulation Material | Thickness (inches) |
| Glass Fiber | 6 |
| Styrene Foam | 5 |
| Mineral Wool | 5 |
| Styrene Beadboard | 4 3/5 |
| Resinate 888 Insulation | 3 |

In contrast, with the insulating material of the present invention, thicknesses of from about $\frac{1}{8}$ inch to about $\frac{1}{4}$ inch has an R-value in the range of 16.6 to 20.0. The improvement over existing insulating materials is deemed astounding and, thus, the insulating materials of this invention is particularly adapted to insulating applications which are not feasible with known insulating materials. The coefficient of heat transmission (U-factor) through any panel is determined by adding the values of the resistance to heat flow for each of the mediums, divide the sum of resistance into one, and multiply the quotient by 1/12, which will equal the "U" factor. That is, U=1/R·1/12

The basis for the 1/12 is the fact that a grid structure with a thickness of 1/16 inch cross section area has only 12 square inches of material in one square foot. That is, the wall thickness of the grid structure is 1/32 inch. Heat conductivity through a vacuum at a pressure of $10^{-3}$ torr is essentially zero. Therefore, the path of heat conductivity for a vacuum panel is through the grid structure which is only 1/12 of 144 square inches. A vacuum insulating panel constructed with ⅛ inch hardboard ⅜ inch gypsum board, and a ½ inch grid spacer, will have a maximum "U" factor of approximately 0.041 at $10^{-3}$ torr. The "U" factor is determined from the following formula:

| | |
|---|---|
| Inside air film, 1/1.46 = | 0.68 Resistance |
| Outside air film, 1/1.46 = | 0.68 Resistance |
| ⅜ inch gypsum board = | 0.32 Resistance |
| ¼ inch fiber board = | 0.09 Resistance |
| ½ inch deep polystyrene grid = | 0.20 Resistance |
| TOTAL RESISTANCE IN BTU = | 1.97 |

$$U = \frac{1}{R} \cdot \frac{1}{12}$$

U = 1/1.97 × 1/12
U = 0.041

The above "U" factor is theoretically improved by an overlay of an aluminum foil film as described herein. The amount of improvement has been discounted to compensate for minor imperfections in formula calculations.

In one square foot of panel made with the cross configuration of FIGS. 8 and 9, there has been calculated a solid material for conduction through the panel to be only twelve square inches in a square foot of panel. The remaining area is evacuated space maintained at $10^{-3}$ torr where the heat transfer is zero.

The "U" factor for glass is 1.13 BTU per square foot per °F. at ⅛ inch thick. Thus, the "U" factor is calculated for a panel constructed of a plurality of cross-shaped insulating elements with a dead air space between each element as follows:

The composite R-value for a panel made of cross-shaped cell elements having wall thickness of 1/32 inch and dead air space between cells has been estimated to be 1.57.

Thus, the "U" factor is calculated

U=1/R·1/12=1/1.57 1/12=0.050

The "U" value for a single layer of insulating structure is about 0.050 BTU when disposed in a two layer arrangement the "U" value for composit structure reduces to 0.030 BTU per square foot per degree Fahrenheit. A three layer structure would have a "U" value of about 0.020 BTU per square foot. The ultimate minimal "U" value would approach zero as more layers are added.

In terms of the R-value for the invention
A "U" factor of 0.060=R-value of 16.7.
A "U" factor of 0.050=R-value of 20.0.
The following average American home wall cross section today has an R-value of about 15.0.

By adding one layer of this disclosed invention as an inside wall overlay the R-value is improved to 31.7. This would cut fuel bill by a minimum of 50% per year.

The U-factor for an individual cross-shaped insulating cell is calculated as follows. A cross having a 3 inch by 3 inch length dimension with each arm of the cross being 1 inch wide covers an area of 5 square inches. Therefore, the perimeter length of the wall for the cross-shaped element is 12 inches. The U-factor is the amount of heat transfer in a square foot of surface area. Therefore, there are about 29 cross-shaped cell elements in one square foot. Based upon the calculation of the U-factor for 1 square foot of a panel to be 0.050 as shown above, the U-factor for a single cell element is then 1/29×0.050 which equals 0.00172. This equals an R-value of 1/0.00172 or 581.40.

Calculating this by another method, this same cross-shaped cell element having a wall thickness of 1/32 inch provides 10.88 square inches of glass through which heat may pass by conduction in a square foot of area. With the U-factor for glass designated 1.13, the U-factor for a one square foot panel composed of 29 elements is calculated as follows: 10.88 in²/144 in²×1.13=0.09

Thus, to determine the U-factor for a single cell element, 0.09 is divided by 29 cells in a square foot and this equals 0.0031. The related R-value is 1/0.0031 or 322.58.

While the insulating cell element and structures composed thereof has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A thermal insulation structure comprising:
   (a) a plurality of insulating cell elements contiguously disposed with respect to each other to form a monolithic structure,
   (b) each of the insulating cell elements including a hermetically sealed shell defining a closed chamber having a volumetric space with a vacuum established in an amount sufficient to achieve a minimal heat conductivity through said space,
   (c) each of the shells having a structural configuration effective to resist the outside pressure resulting when said vacuum is established in the closed chamber and being further effective to maintain said vacuum over a substantially unlimited period of time,
   (d) each shell being separate and independent with respect to each other to form individual cell elements whereby the loss of vacuum in any single chamber does not adversely affect the vacuum conditions in a contiguously disposed insulating cell element,
   (e) the monolithic structure having a heat transfer of down to at least about 0.050 Btu's per square foot at an overall thickness of about ⅛ of an inch.

2. A structure as defined in claim 1 wherein the monolithic structure includes a layer of insulating cell elements having contacting surfaces contiguously disposed with respect to each other and means for holding the cell elements in said contiguous disposition.

3. A structure as defined in claim 2 wherein the cell element holding means includes an adhesive material which bonds the contiguously disposed elements together, said adhesive material being effective to allow the shell material of the cell elements to move in accordance with its coefficient of linear expansion.

4. A structure as defined in claim 2 wherein there is a plurality of layers of the insulating cell elements, and the cell elements of one layer overlay the contacting surfaces of the cell elements in the next layer.

5. A structure as defined in claim 2 wherein the cell element holding means includes a continuous sheet of material disposed across at least one side of said layer.

6. A structure as defined in claim 5 wherein the continuous sheet of material is rigid to form a structural panel with the cell elements.

7. A structure as defined in any one of the claims 2, 3, 4, 5, or 6 wherein each shell includes a pair of parallel sides which contain the evacuated space therebetween so that when the contacting surfaces of the insulating cell elements are contigously disposed there is formed two planar, opposed sides along said layer.

8. An insulating cell element comprising:

(a) a hermetically sealed shell defining a closed chamber having a volumetric space contained by the chamber wall, (b) said space having a vacuum established in an amount sufficient to achieve a minimal heat conductivity through said space, (c) the shell having a structural configuration effective to resist the outside pressure resulting when said vacuum is established in the closed chamber, (d) said shell being effective to maintain said vacuum over a substantially unlimited period of time, (e) the energy transfer for the element being down to at least about 0.050 Btu's per square foot at an overall thickness of about $\frac{1}{8}$ of an inch.

9. An element as defined in claim 8 wherein the shell material is translucent.

10. An element as defined in claim 8 wherein the shell material is transparent.

11. An element as defined in claim 8 wherein the shell material is effective to allow infrared rays to pass therethrough.

12. An element as defined in claim 8 wherein a portion of the chamber wall has a film of getter material disposed thereon to absorb any substance which may be volatilized from the shell material into the evacuated space.

13. An element as defined in claim 8 wherein a shield means is disposed in the chamber to prevent gas molecules moving from one section of the chamber wall across the volumetric space to another section of the chamber wall.

14. An element as defined in claim 8 wherein the shell includes a pair of parallel sides and side walls which contain the evacuated space.

15. An element as defined in claim 14 wherein a film of getter material is disposed on a portion of the side walls to absorb any substance which may be volatilized from the shell material into the evacuated space.

16. An element as defined in claim 14 wherein the parallel sides have the shape of a cross.

17. An element as defined in claim 16 wherein the length of each of the two cross members is about 3 inches and the overall thickness of the element is from about $\frac{1}{8}$ of an inch to about $\frac{1}{2}$ inch.

18. An element as defined in claim 8 wherein the vacuum is at a level of about $10^{-3}$ torr.

19. An element as defined in claim 8 wherein the minimal heat conductivity is substantially zero.

20. An assembly for storing heat, said assembly comprising:

(a) a heat absorbing material disposed in an insulated container, (b) the insulated container having a housing composed of a plurality of insulating cell elements contiguously disposed with respect to each other to form a monolithic structure, (c) each of the insulating cell elements including a hermetically sealed shell defining a closed chamber having a volumetric space with a vacuum established in an amount sufficient to achieve a minimal heat conductivity through said space, (d) each of the shells having a structural configuration effective to resist the outside pressure resulting when said vacuum is established in the closed chamber and being further effective to maintain said vacuum over a substantially unlimited period of time, (e) each shell being separate and independent with respect to each other to form individual cell elements whereby the loss of vacuum in any single chamber does not adversely effect the vacuum conditions in a contiguously disposed insulating cell element, (f) the monolithic structure having a heat energy transfer of down to at least about 0.050 BTU per square foot at an overall thickness of about $\frac{1}{8}$ of an inch, (g) at least a portion of said housing being effective to allow heat from the sun to pass from the outside of the container therethrough to the heat absorbing material disposed in the container.

21. A thermal insulation structure comprising:

(a) a plurality of insulating cells contiguously disposed with respect to each other to form a monolithic structure, (b) each of the insulating cells having a wall defining a closed chamber having a volumetric space with a vacuum established in an amount sufficient to achieve a minimal heat conductivity through said space, (c) each of the cells having a structural configuration effective to resist the outside pressure resulting when said vacuum is established in the closed chamber and being further effective to maintain said vacuum over a substantially unlimited period of time, and (d) radiation shield means disposed within said chamber to prevent gas molecules moving from one section of the chamber wall across the volumetric space to another section of the chamber wall.

* * * * *